(12) United States Patent
He et al.

(10) Patent No.: US 11,516,658 B2
(45) Date of Patent: Nov. 29, 2022

(54) EFFICIENT AND SECURE DISTRIBUTED SIGNING PROTOCOL FOR MOBILE DEVICES IN WIRELESS NETWORKS

(71) Applicant: Board of Regents, The University of Texas System, Austin, TX (US)

(72) Inventors: Debiao He, Wuhan (CN); Kim Kwang Choo, San Antonio, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 353 days.

(21) Appl. No.: 16/460,267

(22) Filed: Jul. 2, 2019

(65) Prior Publication Data

US 2020/0015078 A1 Jan. 9, 2020

Related U.S. Application Data

(60) Provisional application No. 62/693,585, filed on Jul. 3, 2018.

(51) Int. Cl.
*H04W 12/04* (2021.01)
*H04L 9/08* (2006.01)
*H04L 9/32* (2006.01)
*H04W 12/041* (2021.01)

(52) U.S. Cl.
CPC ......... *H04W 12/041* (2021.01); *H04L 9/0825* (2013.01); *H04L 9/3218* (2013.01); *H04L 9/3247* (2013.01); *H04L 9/3271* (2013.01)

(58) Field of Classification Search
CPC .. H04W 12/041; H04L 9/0825; H04L 9/3218; H04L 9/3247; H04L 9/3271

USPC ......................................................... 380/270
See application file for complete search history.

(56) References Cited

U.S. PATENT DOCUMENTS

| | | | | |
|---|---|---|---|---|
| 8,356,182 | B2* | 1/2013 | Teranishi | H04L 9/0877 713/180 |
| 8,762,729 | B2* | 6/2014 | Hwang | H04L 9/3255 713/176 |
| 10,498,537 | B2* | 12/2019 | Tiwari | H04L 63/0807 |
| 2006/0285683 | A1* | 12/2006 | Anatharaman | H04L 9/085 380/30 |
| 2009/0106551 | A1* | 4/2009 | Boren | H04L 9/321 380/259 |
| 2010/0235588 | A1* | 9/2010 | Maeda | H04L 9/085 711/147 |
| 2013/0054971 | A1* | 2/2013 | Yamaguchi | H04L 63/0876 713/171 |

(Continued)

OTHER PUBLICATIONS

Garay et al., Strengthening Zero-Knowledge Protocols Using Signatures, 2003, Bell Labs—Lucent Technologies, pp. 177-192 (Year: 2003).*

*Primary Examiner* — Haresh N Patel
(74) *Attorney, Agent, or Firm* — Smith, Gambrell & Russell LLP

(57) ABSTRACT

The techniques described herein may provide an efficient and secure two-party distributed signing protocol for the identity-based signature scheme described in the IEEE P1363 standard. For example, in an embodiment, a method may comprise generating a distributed cryptographic key at a key generation center and a first other device and a second other device and generating a distributed cryptographic signature at the first other device using the second other device.

10 Claims, 12 Drawing Sheets

(56) References Cited

U.S. PATENT DOCUMENTS

| | | | |
|---|---|---|---|
| 2013/0073845 A1* | 3/2013 | Teranishi | H04L 9/3221 |
| | | | 713/156 |
| 2015/0019868 A1* | 1/2015 | Lee | H04L 9/3073 |
| | | | 713/170 |
| 2015/0312759 A1* | 10/2015 | Kim | H04W 4/02 |
| | | | 455/411 |
| 2016/0080157 A1* | 3/2016 | Lundström | H04L 63/126 |
| | | | 713/176 |
| 2017/0272433 A1* | 9/2017 | Jaggi | H04W 8/18 |
| 2018/0145825 A1* | 5/2018 | Isshiki | H04L 9/0618 |
| 2018/0302217 A1* | 10/2018 | Hevia Angulo | H04L 9/085 |
| 2019/0294820 A1* | 9/2019 | Martin | G06F 21/6254 |
| 2020/0005173 A1* | 1/2020 | del Pino | H04L 9/30 |
| 2020/0015078 A1* | 1/2020 | He | H04L 9/008 |

\* cited by examiner

Fig. 2

BLMQ SIGNATURE SCHEME

1) Setup: Given a security parameter $n$, KGC executes the following steps to produce the system parameters params:
   a) Choose $G_1, G_2, G_3$ and a pairing $e : G_1 \times G_2 \to G_3$.
   b) Pick a random generator $Q_2$ of $G_2$, calculate $Q_1 = \phi(Q_2) \in G_1$.
   c) Generate a random number $s \in \mathbb{Z}_p$ as the master secret key, and calculate $R = sQ_2$ and $g = e(Q_1, Q_2)$.
   d) Set the system parameters params $= (R, g, Q_1, Q_2, G_1, G_2, G_3, e)$ available.

2) Extract: Given a user's identity $ID$, KGC executes the following steps to produce user's private key.
   a) Compute the identity element $h_{ID} = H_1(ID)$ in $\mathbb{Z}_p$.
   b) Output $K_{ID} = (h_{ID} + s)^{-1} Q_1$.

3) Sign: Given a message $m$, the user with the identity $ID$ executes the following steps to generate the signature $\sigma$.
   a) Compute $u = g^r$, where $r$ is a random integer.
   b) Compute $h = H_2(m, u)$ and $S = (r+h)K_{ID}$.
   c) Output $\sigma = (h, S)$.

4) Verify: Given the signature $\sigma = (h, S)$, the identity $ID$ and the message $m$, the verifier executes the following steps to verify the validation of the signature.
   a) Compute $h_{ID} = H_1(ID)$.
   b) Compute $u = \frac{e(S, h_{ID}Q_2 + R)}{e(Q_1, Q_2)^h}$.
   c) If $h = H_2(m, u)$, then output 1, otherwise output 0.

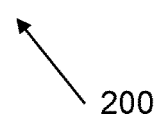

Fig. 3

Paillier Encryption

302 — 1) Key Generation:
304 — a) Choose two equivalent length large prime numbers $p$ and $q$ randomly.
306 — b) Compute $g = n + 1$, $\lambda = \phi(n)$ and $\mu = (\phi(n))^{-1} \mod n$, where $\phi(n) = (p-1)(q-1)$.
308 — c) The public key is $pk = (n, g)$, the private key is $sk = (\lambda, \mu)$.
310 — 2) Encryption:
312 — a) Select a random number $r$ where $r \in \mathbb{Z}_n^*$.
314 — b) Compute ciphertext $c = \text{Enc}_{pk}(m) = g^m \cdot r^n \mod n^2$, where $0 \leq m < n$.
316 — 3) Decryption:
318 — a) Decrypt the ciphertext as $m = \text{Dec}_{sk}(c) = L(c^\lambda \mod n^2) \cdot \mu \mod n$, where $L(x) = \frac{x-1}{n}$.

502 — Phase 1: Distributed Key Generation.

504 — 1) KGC computes the user ID's identity element $h_{ID} = H_1(ID)$.

506 — 2) KGC selects an integer $t_1$, and computes $t_2 = t_1^{-1} \cdot (h_{ID} + s)^{-1}$.

508 — 3) KGC sets $K_{ID}^{(1)} = t_1 Q_1$, and $K_{ID}^{(2)} = t_2$.

510 — 4) KGC generates a Paillier key-pair $(pk, sk)$ for $P_1$.

512 — 5) KGC sends $(K_{ID}^{(1)}, pk, sk)$ to $P_1$, and sends $(K_{ID}^{(2)}, pk)$ to $P_2$.

514 — 6) $P_1$ stores $(ID, K_{ID}^{(1)}, pk, sk)$ and the public parameter $P$, and $P_2$ stores $(ID, K_{ID}^{(2)}, pk)$ and the public parameter params.

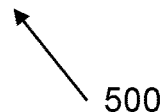

Phase 2: Distributed Signature Generation

704 — 1) $P_1$'s first message:
706 — a) $P_1$ chooses $r_1 \xleftarrow{r} \mathbb{Z}_q$, and computes $R_1 = g^{r_1}$.
708 — b) $P_1$ computes $C_1 = \text{Enc}_{pk}(r_1)$.
710 — c) $P_1$ sends $(\text{prove}, 1, (R_1, C_1), (r_1, sk))$ to $\mathcal{F}_{zk}^{R_{PDL}}$.

712 — 2) $P_2$'s first message:
714 — a) $P_2$ receives $(\text{proof}, 1, (R_1, C_1))$ from $\mathcal{F}_{zk}^{R_{PDL}}$, if not, it aborts.
716 — b) $P_2$ chooses $r_2 \xleftarrow{r} \mathbb{Z}_q$, and computes $R_2 = g^{r_2}$.
718 —
720 — c) $P_2$ sends $(\text{prove}, 2, R_2, r_2)$ to $\mathcal{F}_{zk}^{R_{DL}}$.
722 — d) $P_2$ computes $u = R_1^{r_2}, h = H_2(m, u)$.
       e) $P_2$ chooses $\rho \xleftarrow{r} \mathbb{Z}_q$, computes $C_2 = K_{ID}^{(2)} \otimes (r_2^{-1} \odot C_1 \oplus \text{Enc}_{pk}(\rho \cdot q + h))$.
724 — f) $P_2$ sends $C_2$ to $P_1$.

726 — 3) $P_1$ generates the output:
728 — a) $P_1$ receives $(\text{proof}, 2, R_2)$ from $\mathcal{F}_{zk}^{R_{DL}}$; if not, it aborts.
730 — b) $P_1$ computes $S' = \text{Dec}_{sk}(C_2) \mod q$, then computes $S = S' \cdot K_{ID}^{(1)}$.
732 —
734 — c) $P_1$ computes $u = R_2^{r_1}$ and $h = H_2(m, u)$.
       d) $P_1$ verifies $(h, S)$ by the identity $ID$, if the signature is valid, it then outputs $(h, S)$, otherwise, it aborts.

700

EFFICIENT AND SECURE DISTRIBUTED SIGNING PROTOCOL FOR MOBILE DEVICES IN WIRELESS NETWORKS

CROSS-REFERENCE TO RELATED APPLICATIONS

This application claims the benefit of U.S. Provisional Application No. 62/693,585, filed Jul. 3, 2018, the contents of which are hereby incorporated by reference herein in their entirety.

BACKGROUND OF THE INVENTION

The present invention relates to an efficient and secure two-party distributed signing protocol for the identity-based signature scheme described in the IEEE P1363 standard.

Rapid advances in wireless communications, hardware/software and Internet technologies have led to an exponential growth in the number of users accessing the Internet using mobile, wearable or other Internet of Things (IoT) devices. Identity-based signature schemes have been widely applied to enforce user authorization and validate user messages in mobile wireless networks. Unfortunately, the user's private key used to generate signatures is prone to leakage because the key is being stored on the mobile device. Several (t; n) threshold secret sharing schemes have been proposed to address the issue. However, the private keys in most of those schemes have to be recovered on a single device when generating signatures so that the user who holds the device can sign any message without the participation of other users.

The IEEE P1363 project is well-known for issuing standard specifications for public-key cryptography through a series of IEEE standards documents. The IEEE Standard 1363-2000 consists of the following parts: 1) Traditional public-key cryptography (1363-2000 & 1363a-2004); 2) Lattice-based public-key cryptography (P1363.1); 3) Password-based public key cryptography (P1363.2); and 4) Identity-based public key cryptography using pairings (P1363.3). The BLMQ signature scheme is the identity-based signature scheme in the IEEE P1363 standard, and has been widely used in many practical applications. However, the BLMQ signature scheme does not provide an efficient and secure two-party distributed signing protocol.

Accordingly, a need arises for techniques that provide efficient and secure two-party distributed signing protocol for the identity-based signature scheme described in the IEEE P1363 standard.

SUMMARY OF THE INVENTION

The techniques described herein may provide an efficient and secure two-party distributed signing protocol for the identity-based signature scheme described in the IEEE P1363 standard.

For example, in an embodiment, a method may comprise generating a distributed cryptographic key at a key generation center and a first other device and a second other device and generating a distributed cryptographic signature at the first other device using the second other device.

In embodiments, generating the distributed cryptographic key may comprise generating, at the key generation center, a user ID private key based on a user ID, and a Paillier Paillier key pair comprising a public key and a private key, transmitting the user ID private key, the Paillier public key, and the Paillier secret key from the key generation center to the first other device, and transmitting the user ID private key and the Paillier public key from the key generation center to a second other device. Generating a distributed cryptographic signature may comprise transmitting a message from the first other device to a zero knowledge functionality, the message comprising a request for proof that the second other device possesses the user ID private key and in response to receiving the message from the first other device, transmitting a message from the zero knowledge functionality comprising proof that the first other device possesses the user ID private key. Generating a distributed cryptographic signature may further comprise in response to receiving the message from the zero knowledge functionality, transmitting a message from the second other device to the zero knowledge functionality comprising a request for proof of a relation and in response to receiving the message from the second other device, transmitting a message from the zero knowledge functionality comprising proof that the second other device possesses the relation. Generating a distributed cryptographic signature may further comprise in response to receiving the message from the zero knowledge functionality, transmitting a message from the second other device to the first other device comprising a challenge based on the relation and in response to receiving the message from the zero knowledge functionality and the message from the second other device, computing, at the first other device, a signature based on the user ID private key and on the challenge.

In an embodiment, a system may comprise a key generation center adapted to generate a distributed cryptographic key in communication with a first other device, the first other device adapted to generate a distributed cryptographic signature in communication with key generation center and using a second other device, and the second other device adapted to generate the distributed cryptographic signature in communication with the first other device.

A computer program product comprising a non-transitory computer readable storage having program instructions embodied therewith, the program instructions executable by at least one computer system, to cause each computer system to perform a method comprising: generating a distributed cryptographic key at a key generation center and a first other device and a second other device and generating a distributed cryptographic signature at the first other device using the second other device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and the invention may admit to other equally effective embodiments.

FIG. 2 illustrates an exemplary flow diagram of the BLMQ signature scheme.

FIG. 3 illustrates an example of the Paillier cryptosystem.

FIG. 5 illustrates an exemplary flow diagram of Phase 1 in accordance with embodiments of the present systems and methods.

FIG. 7 illustrates an exemplary flow diagram of Phase 2 in accordance with embodiments of the present systems and methods.

Other features of the present embodiments will be apparent from the Detailed Description that follows.

DETAILED DESCRIPTION OF THE EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Electrical, mechanical, logical, and structural changes may be made to the embodiments without departing from the spirit and scope of the present teachings. The following detailed description is therefore not to be taken in a limiting sense, and the scope of the present disclosure is defined by the appended claims and their equivalents.

Technologies such as smart mobile devices and Internet of Things (IoT) devices have dramatically changed how we communicate (wired or wirelessly) in today's increasingly interconnected society. The number of smartphone users in the United States is in the hundreds of millions, with the number of smartphone users worldwide in the billions. Ensuring wired network security is generally easier compared to wireless network security. Additional challenges exist with wireless networks because mobile wireless devices tend to be lightweight or have limited communication and storage capabilities (for example, wireless pacemakers, and smart military uniforms). In e-commerce, such as Business to Business (B2B) and Business to Customer (B2C), wireless communications may also be subject to more sophisticated attacks.

Figure 1:
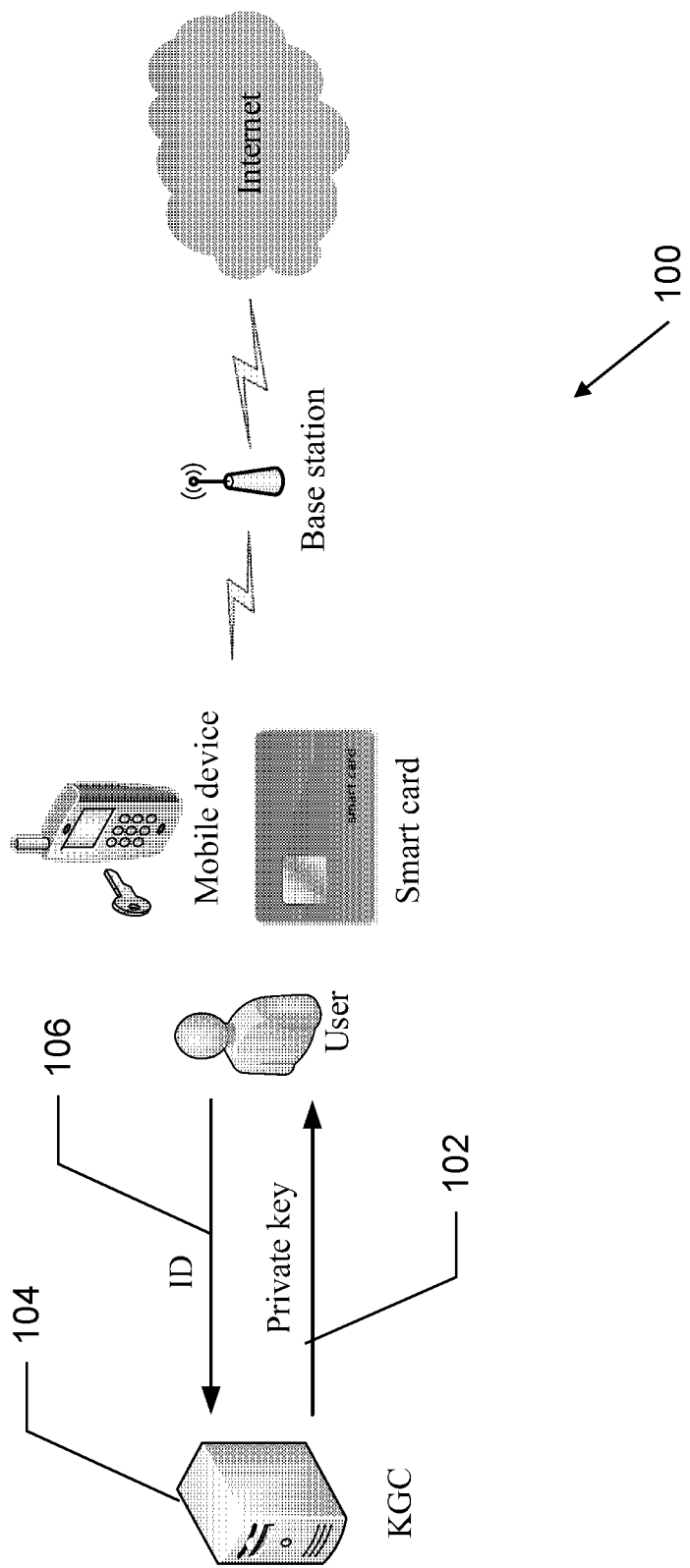
FIG. 1 illustrates an example of a typical identity-based signature architecture for the wireless environment.

Identity-based cryptography is an identity-based signature scheme wherein the user's public key can be obtained from user's ID or email address. Many identity based signature schemes have been proposed. Identity-based signature schemes have been used in many practical applications. FIG. 1 shows a typical identity-based signature architecture 100 for the wireless environment wherein the user's private key 102 must be used when signing. Also shown in FIG. 1, are key generation center (KGC) 104 and the user's identity (ID) 106.

Thus, it is important to be able to authenticate a user and the message. To authenticate an individual, we generally rely on the user "proving" the ownership of the corresponding private signing key by some means. Such private keys are normally stored on the mobile device or smart card, which may be remotely compromised if physically acquired by an attacker.

One common approach is through the use of a (t, n)—threshold secret sharing scheme, which extends the secret sharing. Threshold secret sharing schemes have been used in many applications. In the (t, n)—threshold secret sharing scheme, a private key is shared among n parties. Any information about the private key cannot be obtained from t−1 or fewer shares, and with a subset of t or more shares, the whole private key can be recovered. Thus, threshold cryptography provides a high of level security for the private key because by corrupting less than t−1 parties or devices, the adversary will obtain nothing about the secret.

However, the (t, n)—threshold secret sharing scheme has a limitation. Specifically, any party who holds the recovered private key can sign any document without the participation of other parties. Moreover, the recovered private key is normally stored in a mobile device, which can be compromised. Several two-party protocols have also been designed to mitigate such a reconstruction limitation. Compared with the conventional secret sharing scheme, in a two-party protocol, two parties interact with each other and output a signature without recovering the private key.

The BLMQ signature scheme is the identity-based signature scheme in the IEEE P1363 standard, and has been widely used in many practical applications. In embodiments, the present systems and method may provide an efficient and secure two-party distributed signing protocol for the identity-based signature scheme described in the IEEE P1363 standard.

In embodiments, the present systems and method may provide a two-party distributed signing protocol for an identity-based signature scheme. Embodiments may include protocols that provide improved security, efficiency, and practicality in a wireless environment. Embodiments may include a novel two-party distributed signing protocol, which is a fast threshold cryptography protocol for an identity-based signature scheme. In embodiments, the protocol can generate a valid signature without recovering the private key. Further, a valid signature cannot be generated if one of the participants is not involved. Security analysis of embodiments of the protocol shows that the protocol can satisfy security requirements. Moreover, such security may be proven under the non-standard assumption, and satisfy the zero-knowledge proof analysis.

Preliminaries. Notations. Let D denote a random distribution or set, and $x r D$ denote that x is selected from D randomly. The security parameter is n, and a function $\mu(n)$ is negligible, if for any polynomial p, $\mu(n)=O(1/p(n))$. P.P.T denotes a probabilistic-polynomial time algorithm, and KGC denotes a trusted Key Generation Center (KGC). $H_1$ and $H_2$ are two secure hash functions, such that $H_1$: $\{0,1\}^* \to Z_q$, and $H_2$: $\{0,1\}^* \to Z_q$.

Bilinear pairing let $G_1$ and $G_2$ be two cyclic additive groups, $G_3$ be a multiplicative group, and $e: G_1 \times G_2 \to G_3$ denotes a bilinear map satisfies the following properties:

1. For $a_1, a_2 \in G_1$ and $b_1, b_2 \in G_2$, $e(a_1+a_2, b_1)=e(a_1,b_1)e(a_2,b_1)$ and $e(a_1,b_1+b_2)=e(a_1,b_1)e(a_1,b_2)$.
2. For all $0 \neq a \in G_1$, there exists $b \in G_2$ such that $e(a,b) \neq 1$.
3. For all $0 \neq b \in G_2$, there exists $a \in G_1$ such that $e(a,b) \neq 1$.

BLMQ signature scheme. An exemplary flow diagram of the BLMQ signature scheme 200 is shown in FIG. 2. BLMQ signature scheme 200 includes the following four processes. Setup process 202, given a security parameter n, KGC produces the system parameters params. Setup process 202 begins at 204, in which the process chooses $G_1, G_2, G_3$ and a pairing $e:G_1 \times G_2 \to G_3$. At 206, the process picks a random generator $Q_2$ of $G_2$, and calculates $Q_1=\phi(Q_2) \in G_1$. At 208, the process generates a random number $s \in Z_p$ as the master secret key, and calculates $R=sQ_2$ and $g=e(Q_1,Q_2)$. At 210, the process sets the system parameters params=$(R,g,Q_1,Q_2, G_1,G_2,G_3,e)$ as available.

Extract process 212, given a user's identity ID, KGC produces the user's private key. Extract process 212 begins at 214, in which the process computes the identity element $h_{ID}=H_1(ID)$ in $Z_p$. At 216, the process outputs $K_{ID}=(h_{ID}+s)^{-1}Q_1$.

In sign process 218, given a message m, the user with the identity ID generates the signature σ. Sign process 218 begins at 220, in which the process computes $u=g^r$, where r is a random integer. At 222, the process computes $h=H_2(m,u)$ and $S=(r+h)K_{ID}$. At 224, the process outputs σ=(h,S).

In verify process 226, given the signature σ=(h,S), the identity ID and the message m, the verifier verifies the validation of the signature. Verify process 226 begins at 228, in which the process computes $h_{ID}=H_1(ID)$. At 230, the process computes $$u = \frac{e(S, h_{ID}Q_2 + R)}{e(Q_1, Q_2)^h}.$$

At 232, if $h=H_2(m,u)$, then the process outputs 1, otherwise the process outputs 0.

Zero-Knowledge Proof. The ideal zero knowledge functionality is $\mathcal{F}_{zk}$, and the standard ideal zero-knowledge functionality is defined by $((x,w), \lambda) \to (\lambda,(x,R(x,w)))$, where λ denotes the empty string.

Definition 1: The zero-knowledge functionality $\mathcal{F}_{zk}^R$ for relation R: Upon receiving (prove,sid,x,w) from $P_i$ (i∈{1, 2}): if $(x,w) \notin R$ or sid has been previously used, then ignore the message. Otherwise, send (proof,sid,x) to $P_{3-i}$. The non-interactive zero-knowledge proof of knowledge satisfying $\mathcal{F}_{zk}$ can be achieved in random oracle model.

Paillier Encryption. In embodiments, the Paillier cryptosystem may be used for encryption. An example of the Paillier cryptosystem 300 is shown in FIG. 3. Paillier cryptosystem 300 includes the following three processes. Key Generation process 302 begins with 304, in which the process chooses two equivalent length large prime numbers p and q randomly. At 306, the process computes $g=n+1$, $\lambda=\phi(n)$ and $\mu=(\phi,(n))^{-1}n$, where $\phi)(n)=(p-1)(q-1)$. At 308, the process outputs the public key, which is pk=(n,g), and the private key, which is sk=(λ,μ)

Encryption process 310 begins with 312, in which the process selects a random number r where $r \in Z^*_n$. At 314, the process computes ciphertext $c=Enc_{pk}(m)=g^m \cdot r^n \bmod n^2$, where $0 \le m < n$.

Decryption process 316 includes 318, in which the process decrypts the ciphertext as $m=Dec_{sk}(c)=L(c^\lambda n^2) \cdot \mu \bmod n$, where $$L(x) = \frac{x-1}{n}.$$

In embodiments, $Enc_{pk}(\cdot)$ denotes the encrypt operation using public key pk, $Dec_{sk}(\cdot)$ denotes the decrypt operation using private key sk. In the Paillier cryptosystem, there is a notable feature which is its homomorphic properties:

1. $Dec_{sk}(Enc_{pk}(m_1) \cdot Enc_{pk}(m_2))=m_1+m_2$.
2. $Dec_{sk}(Enc_{pk}(m_1)^{m_2})=m_1 m_2$.

Let $c_1=Enc_{pk}(m_1)$, $c_2=Enc_{pk}(m_2)$, then $c_1 \oplus c_2 = Enc_{pk}(m_1+m_2)$, $m_2 \otimes c_1 = Enc_p(m_1)^{m_2}$.

Two-Party Distributed Signing Protocol. In embodiments, the present systems and methods may provide a two-party distributed signing protocol for the identity-based signature scheme described in IEEE P1363. The two key phases are the distributed key generation phase and the distributed signature generation phase.

Figure 4:
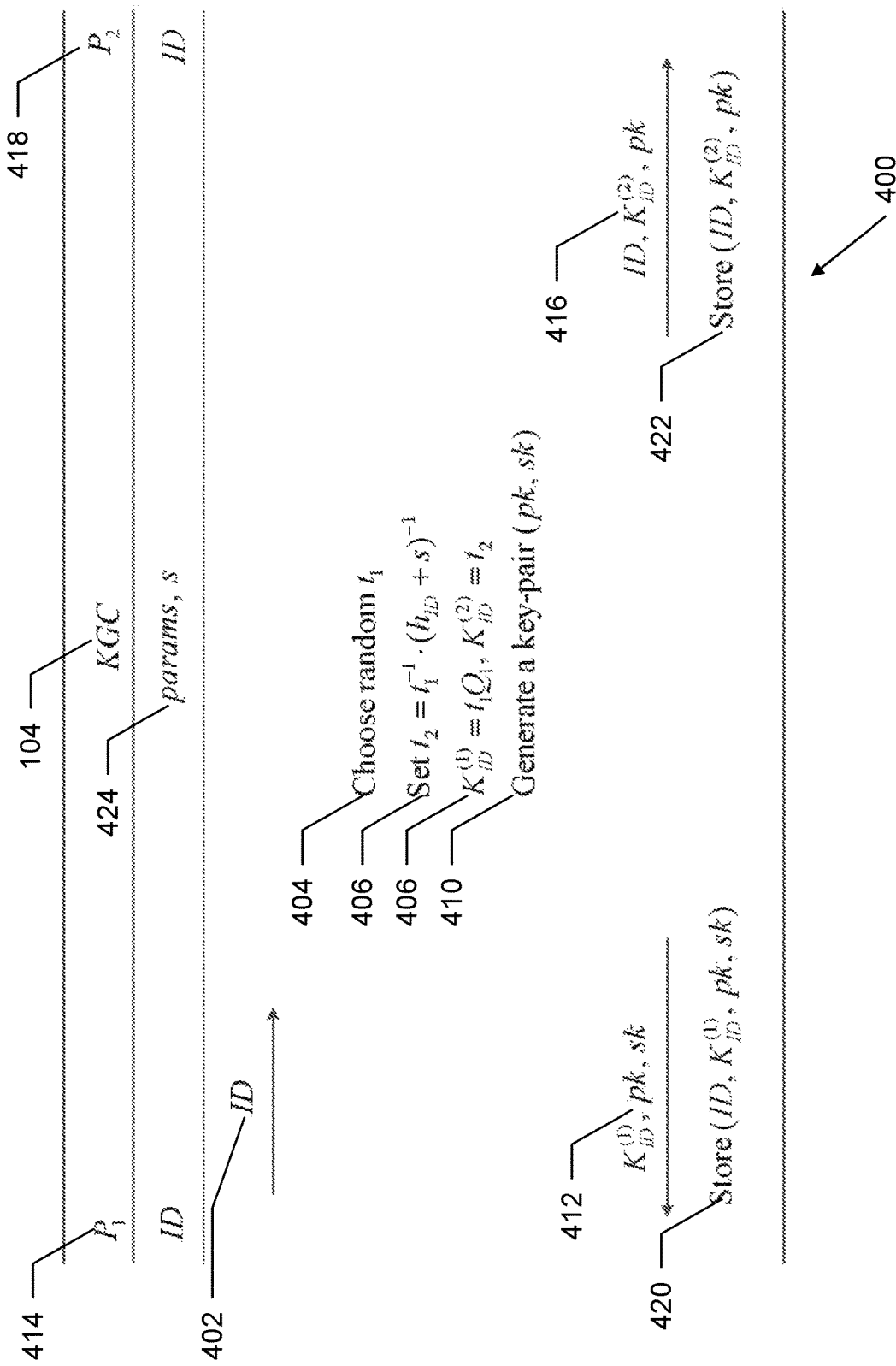
FIG. 4 illustrates an exemplary data flow diagram of distributed key generation in accordance with embodiments of the present systems and methods.

Distributed Key Generation. In the distributed key generation phase, the main algorithms are processed by KGC 104, shown in FIG. 1. An exemplary data flow diagram of distributed key generation 400 is shown in FIG. 4. It is best viewed in conjunction with FIG. 5, which is an exemplary flow diagram of Phase 1 500. As shown in FIG. 4, KGC 104 distributes the private key $K_{ID}$ into two parts.

Phase 1: Distributed Key Generation 500 begins with 502, in which KGC 104 computes the user ID's 402 identity element $h_{ID}=H_1(ID)$. At 504, 404, KGC 104 selects an integer $t_1$, and computes $t_2=t_1^{-1} \cdot (h_{ID}+s)^{-1}$ 406. At 506, 408, KGC 104 sets $K_{ID}^{(1)}=t_1 Q_1$, and $K_{ID}^{(2)}=t_2$. At 508, 410, KGC generates a Paillier key-pair (pk,sk) for $P_1$. At 510, KGC 104 sends $(K_{ID}^{(1)},pk,sk)$ 412 to $P_1$ 414, and sends $(K_{ID}^{(2)},pk)$ 416 to $P_2$ 418. At 512, $P_1$ 414 stores $(ID,K_{ID}^{(1)},pk,sk)$ 420 and the public parameter P, and $P_2$ 418 stores $(ID,K_{ID}^{(2)},pk)$ 422 and the public parameter params 424. It is worth noting that we can check the equation $K_{ID}^{(1)} \cdot K_{ID}^{(2)}=(h_{ID}+s)^{-1}Q_1$.

Distributed Signature Generation. In the distributed signature generation phase, $P_1$ and $P_2$ select $r_1$ and $r_2$ respectively, where $r_1 r_2 = r$, and $u=g^r_1 g^r_2$. $P_1$ encrypts $r_1$ under pk (i.e. $C_1=Enc(r_1)$), computes $R_1=g^{r_1}$, and sends $R_1, C_1$ to $P_2$. After $P_2$ receives $R_1, C_1$, it is trivial for $P_2$ to compute a ciphertext of $S''=(r_1 r_2+h) \cdot K_{ID}^{(2)}$ under $P_1$'s public key. In order to prevent revealing any information to $P_1$, $P_2$ chooses a random integer $$\rho \xleftarrow{r} Z_q,$$

and computes the encryption of $S''=(r_1 r_2+h+\rho \cdot q) \cdot K_{ID}^{(2)}$. Then, $P_1$ can compute $S'=S'' \cdot t_1$, and finally computes the signature $S=S' \cdot Q_1$.

Figure 6:
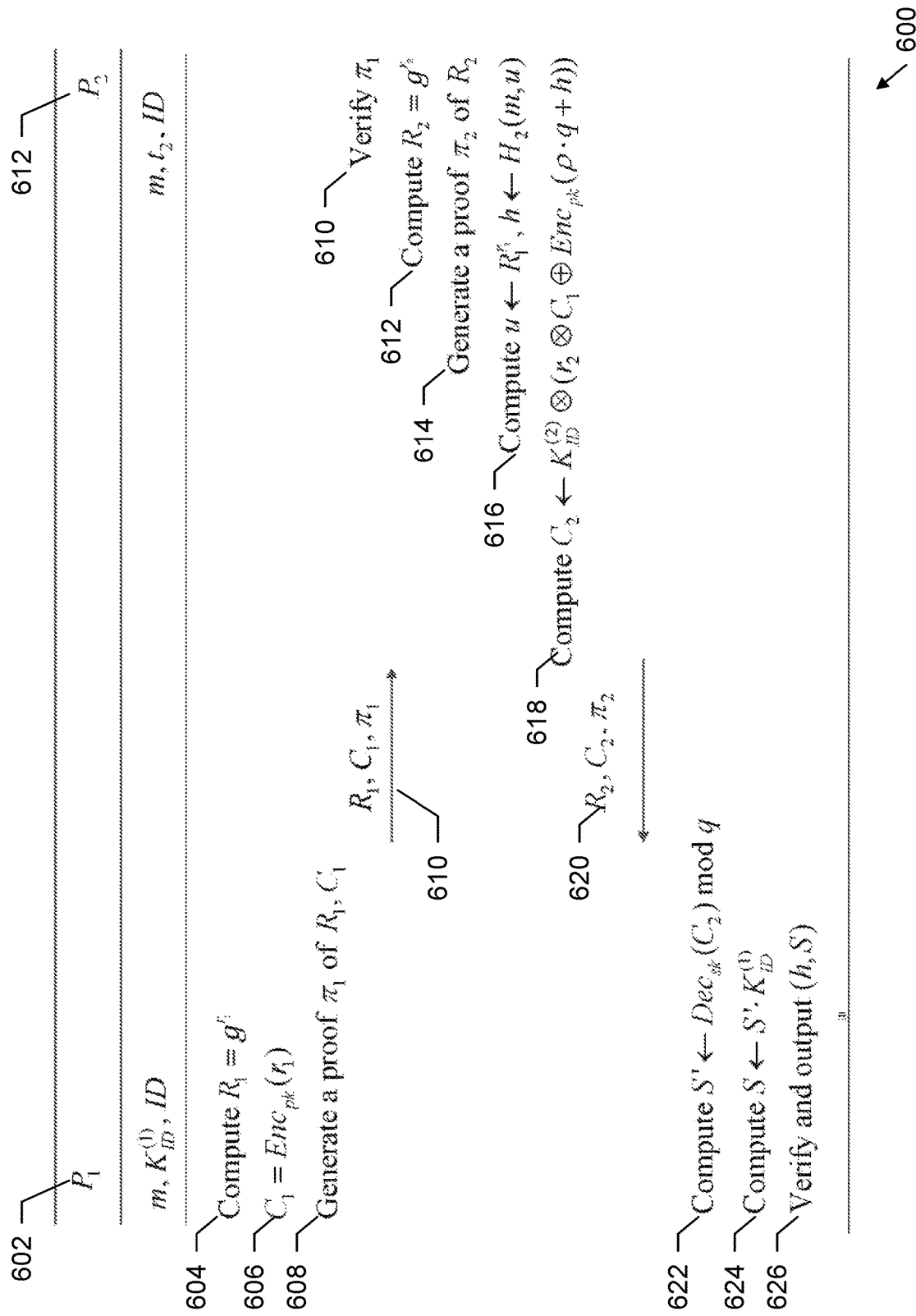
FIG. 6 illustrates an exemplary data flow diagram of distributed signature generation in accordance with embodiments of the present systems and methods.

To verify that the messages that $P_1$ communicated with $P_2$ are correct, we use the zero-knowledge proof. An exemplary data flow diagram of distributed signature generation 600 is shown in FIG. 6. It is best viewed in conjunction with FIG. 7, which is an exemplary flow diagram of Phase 2 700.

Phase 2: Distributed Signature Generation 700 begins with 704, in which $P_1$'s 602 first message is generated by, at 706, $P_1$ 602 chooses $$r_1 \xleftarrow{r} Z_q,$$

and computes $R_1=g^{r_1}$ 604. At 708, $P_1$ 602 computes $C_1=Enc_{pk}(r_1)$ 606. At 708, $P_1$ 602 generates 608 and sends (prove,1,$(R_1,C_1),(r_1,sk))$ 610 to $\mathcal{F}_{zk}^{R_{PDL}}$.

At 712, $P_2$'s 612 first message is generated by, at 714, $P_2$ 612 receives (proof,1,($R_1$,$C_1$)) 610 from $\mathcal{F}_{zk}^{R_{PDL}}$, if not, it aborts. At 716, $P_2$ 612 verifies $\pi_1$ 604, chooses $$r_2 \xleftarrow{r} Z_q,$$

and computes $R_2 = g^{r_2}$ 612. At 718, $P_2$ 612 generates 614 and sends (prove,2,$R_2$,$r_2$) 620 to $\mathcal{F}_{zk}^{R_{DL}}$. At 720, $P_2$ 612 computes $u = R_1^{r_2}$, $h = H_2(m,u)$ 616. At 722, $P_2$ 612 chooses $$\rho \xleftarrow{r} Z_q$$

and computes $C_2 = K_{ID}^{(2)} \otimes (r_2 \otimes C_1 \otimes Enc_{pk}(\rho \cdot q + h))$ 618. At 724, $P_2$ 612 sends $C_2$ 620 to $P_1$ 602.

At 726, $P_1$ 602 generates the output by, at 728, $P_1$ 602 receives (proof,2,$R_2$) 620 from $\mathcal{F}_{zk}^{R_{DL}}$; if not; it aborts. At 730, $P_1$ 602 computes $S' = Dec_{sk}(C_2) \mod q$, 622 then computes $S = S' \cdot K_{ID}^{(1)}$ 624. At 732, $P_1$ 602 computes $u = R_2^{r_1}$ and $h = H_2(m,u)$. At 734, $P_1$ 602 verifies (h,S) 626 by the identity ID, if the signature is valid, it then outputs (h,S) 626, otherwise, it aborts.

Correctness. Due to $C_1 = Enc_{pk}(r_1)$, $C_2 = K_{ID}^{(2)} \otimes (r_2 \otimes C_1 \otimes Enc_{pk}(\rho \cdot q + h))$, $R_2 g^{r_2}$, then $P_1$ can compute $$u = g^{r_1 r_2}$$

$$\begin{aligned}
S &= Dec_{sk}(C_2) q \cdot r_1 Q_1 \\
&= Dec_{sk}\left((C_1^{r_2} + Enc_{pk}(\rho \cdot q + h))^{K_{ID}^{(2)}}\right) q \cdot K_{ID}^{(1)} \\
&= Dec_{sk}(Enc_{pk}(r_1)^{r_2} + Enc_{pk}(\rho \cdot q + h))^{K_{ID}^{(2)}} \mod q \cdot K_{ID}^{(1)} \\
&= ((r_1 r_2 + h + \rho \cdot q) \cdot K_{ID}^{(2)}) \mod q \cdot K_{ID}^{(1)} \\
&= (r_1 r_2 + h) \cdot K_{ID}^{(2)} K_{ID}^{(1)}
\end{aligned}$$

Therefore, the correctness of the proposed distributed signing protocol for the identity-based signature scheme in the IEEE P1363 standard is proved.

Security Analysis. Security Model. Definition 2. IND-CPA Security Let $\mathcal{A}$ be a PPT adversary, C be a challenger. The IND-CPA security is defined by the following game with a negligible advantage.
1. C generates the key-pair (pk,sk), $\mathcal{A}$ obtains pk.
2. $\mathcal{A}$ outputs two messages $m_0, m_1$ ($|m_0|=|m_1|$).
3. C selects $$br \xleftarrow{r} \{0,1\}$$

and encrypts $m_b$ such that $C^* = Enc_{pk}(m_b)$, then returns $C^*$ to C.
4. $\mathcal{A}$ outputs b', $\mathcal{A}$ wins the game when b'=b.

Definition 3. We define an experiment $Sign_{\mathcal{A},\pi}(1^n)$, where $\pi$ is a secure digital signature scheme such that $\pi$=(Gen, Sign, Verify).
1. (vk,sk)←Gen($1^n$).
2. $(m^*, \sigma^*) \leftarrow \mathcal{A}^{sign_{sk}(\cdot)}(1^n, vk)$.
3. Let $\mathcal{M}$ be the set of all m which can be queried. $\mathcal{A}$ can query oracle with m. Then, the experiment outputs 1 if $m^* \notin \mathcal{M}$ and Verify($m^*,\sigma^*$)=1.

Definition 4. A signature scheme $\pi$ is existentially unforgeable under CMA if for every probabilistic polynomial-time oracle machine $\mathcal{A}$, there exists a negligible function $\mu$ such that for every n, $$Pr[Sign_{\mathcal{A},\pi}(1^n)=1] < \mu(n)$$

In the distributed signature generation phase, we define the experiment $DistSign_{\mathcal{A},\Pi}^b(1^n)$ $\mathcal{A}$ an adversary A who can control a party $P_b$ (b∈1,2). In protocol $\Pi$, the honest party $P_{3-b}$ instructs a stateful oracle $\Pi_b(.,.)$. $\mathcal{A}$ can choose which message needs to be signed, and can interact with party $P_{3-b}$. In this definition, the distributed signature generation phase should run after the distributed key generation phase. The oracle is queried by two inputs: a session identifier and an input, and works as follows:
1. Upon receiving a query (sid,m), and if the distributed key generation phase has not been executed, then the oracle output ⊥.
2. Upon receiving a query (sid,m) after the distributed key generation phase has been executed, the oracle invokes a machine $M_{sid}$ which is instructed by $P_{3-b}$ in protocol $\Pi$. $M_{sid}$ is initialized with key share and any stored information from KGC in the distributed key generation phase. If $P_{3-b}$ sends the first message in the signing phase, then the oracle outputs this message.
3. Upon receiving a query (sid,m) after the distributed key generation phase has executed and sid has been queried, the oracle sends the message m to $M_{sid}$, and returns the next message output from $M_{sid}$. If $M_{sid}$ finishes execution, then it returns $M_{sid}$'s output.

In this experiment, $\mathcal{A}$ can control a party $P_b$ with oracle access to $\Pi_b$. $\mathcal{A}$ wins if it can forge a signature on a message $m^*$ which has not been queried in the oracle.

Definition 5. We define an experiment $DistSign_{\mathcal{A},\Pi}^b(1^n)$. Let $\pi$=(Gen, Sign, Verify) be a two-party signing phase.
1. $(m^*, \sigma^*) \leftarrow \mathcal{A}^{(\Pi_b(\cdot,\cdot))}(1^n)$.
2. Let $\mathcal{M}$ be the set of all m which can be queried. $\mathcal{A}$ can query oracle with (sid,m). Then, the experiment outputs 1 if $m^* \notin \mathcal{M}$ and Verify($m^*, \sigma^*$)=1.

Definition 6. A protocol $\Pi$ is a secure two-party protocol for distributed signature generation for $\pi$, if for every P.P.T algorithm $\mathcal{A}$ and every b∈{1,2}, there exists a negligible function $\mu$ for every n, $Pr[DistSign_{\mathcal{A},\Pi}^b(1^n)=1] \leq \mu(n)$.

Definition 7. The functionality $\mathcal{F}_{BLMQ}$ is combined with two functions: extraction and signing. The extraction function can be queried only once, after the key extraction phase, the signing function can be queried an arbitrary number of times. $\mathcal{F}_{BLMQ}$ works with parties $P_1$ and $P_2$, and is defined as follows:
1. After receiving Extract(params,ID) from both $P_1$ and $P_2$:
   (a) Generate a BLMQ key pair ($h_{ID}, K_{ID}$) by computing $h_{ID} = H_1(ID)$, and choosing a random number $$sr \xleftarrow{r} Z_p.$$

Compute $K_{ID}(h_{ID}+s)^{-1} Q_1$. Choose a hash function $H_q: \{0,1\}^* \rightarrow \{0,1\}^{\lceil \log |q| \rceil}$ and store params,ID,$H_q$, $K_{ID}$ (b) Send $h_{ID}$ and $H_q$ to both $P_1$ and $P_2$.
(c) Ignore future queries to Extract.

2. After receiving Sign(sid,m) from both $P_1$ and $P_2$, if Extract was queried and sid has not been used, then compute a BLMQ signature (h,S) of the message m by follows:
(a) Choose a number $$r \xleftarrow{r} Z_q,$$

compute $u=g^r$.
(b) Compute $h-H_q(m,u)$, and $S(r+h)K_{ID}$.
Finally, send the signature (h,S) to both $P_1$ and $P_2$.

Definition 8. The Paillier-EC assumption is hard for every P.P.T adversary A there exists a negligible function $\mu$ that $Pr[\text{Paillier-}EC_{\mathcal{A}}(1^n)=1] \leq \frac{1}{2}+\mu(n)$. Let G be a generator of a group G of order q. The experiment Paillier-$EC_{\mathcal{A}}(1^n)$ is defined as follows:
1. Generate a Paillier key pair (pk,sk).
2. Select $r_0$, $$r_1 \xleftarrow{r} Z_q$$

and compute $R=r_0 \cdot G$.
3. Select $b \in \{0,1\}$ and compute $C=\text{Enc}_{pk}(r_b)$.
4. Let $b' = \mathcal{A}^{O_C(\cdot,\cdot,\cdot)}$ if $\text{Dec}_{sk}(C')=\alpha+\beta \cdot r_b q$, $O_C(C', \alpha, \beta)=1$
5. If and only if b'b, the experiment outputs 1.

Proof of Security. In this section, we prove that the protocol H is a secure two-party protocol for distributed signature generation as shown in the theorem below.

Theorem 1 If Paillier encryption is indistinguishable under CPA (chosen plaintext attack), and BLMQ signature is existentially-unforgeable under a CMA (chosen message attack), then our two-party protocol for distributed signature generation of identity-based signature in IEEE P1363 is secure.

Proof. We now prove the security of our proposed protocol. In addition, if A can break the protocol of zero-knowledge with the probability $\epsilon$, then it can break the protocol with probability $\epsilon+\mu(n)$, $\mu$ is a negligible function.

In our proof, for any adversary A that launches an attack on the protocol, we construct an adversary S who forges a BLMQ signature in Definition 3 with the probability that is negligibly close to the probability that A forging a signature in Definition 5.

If Paillier encryption is indistinguishable under CPA, then for every P.P.T algorithm $\mathcal{A}$ and every $b \in \{1,2\}$, there exists a P.P.T algorithm S and a negligible function $\mu$ such that for every n, $$|Pr[\text{Sign}_{S,\pi}(1^n)=1] - Pr[\text{Dist}Sign_{\mathcal{A},S29}^b(1^n)]=11 \leq \mu(n) \quad (1)$$

where $\Pi$ denotes the protocol of Phase 2, and $\pi$ denotes the BLMQ signature scheme. If we assume that BLMQ signature is secure, there exists a negligible function $\mu'$ for every n that $Pr[\text{Sign}_{S,\pi}(1^n)=1] \leq \mu'(n)$. With Equation 1, we conclude that $Pr[Sign_{\mathcal{A},\Pi}^h(1^n)=1] \leq \mu(n)+\mu'(n)$. We now prove Equation 1 for b=1 and b=2 respectively.

When b=1 i.e., $P_1$ is the corrupted one, let $\mathcal{A}$ be a P.P.T adversary in Dist$Sign_{\mathcal{A},\Pi}^1(n)$, we construct a P.P.T adversary S for $\text{Sign}_{S,\pi}(n)$. S simulates the execution for $\mathcal{A}$ as follows:

1. In Sign, S receives $(1^n,\text{ID})$, where ID is the user's identity which could generate the user's public key $H_1(\text{ID})$.
2. S invokes A on input $1^n$ and simulates oracle $\mathcal{A}$ in DistSign. Upon receiving a query (sid,m), where sid is a new session identifier, S queries its signing oracle in Sign with m and receives a signature (h,S) where $S=\overline{S} \cdot Q_1$. We slightly modify the oracle that lets the signing oracle return $\overline{S}$ to the simulator S. We let the adversary $\mathcal{A}$ compute $t_1 \cdot \text{Dec}_{sk}(C_2)$. u can be computed by the BLMQ signature verification algorithm. Then, $\mathcal{A}$ queries S with identifier sid. The query is processed as follows:
(a) The first message $(\text{sid},m_1)$ is processed by parsing the message $m_1$ since $m_1=(\text{prove},1,(R_1,C_1),(r_1,\text{sk}))$. If $R_1=g^{r_1}$ and $C_1=\text{Enc}_{pk}(r_1)$, then S sets $R_2=u^{1/r_1}$, and sets the oracle's reply message is $(\text{proof},2,R_2)$ and sends it to $\mathcal{A}$. Otherwise, S simulates $P_2$ abortion.
(b) S chooses $$\rho \xleftarrow{r} Z_q,$$

then computes $C_2=\text{Enc}_{pk}(\overline{S}+\rho \cdot q)(t_1)^{-1}$, where $\overline{S}$ is the value from the signature S received from $\mathcal{F}_{BLMQ}$, and sets the oracle's reply message is $C_2$ and sends it to $\mathcal{A}$.

3. Once $\mathcal{A}$ halts and outputs $(m^*,\sigma^*)$, S outputs $(m^*,\sigma^*)$ and halts.

We now prove that the equation 1 holds. In Phase 2, the view of $\mathcal{A}$ in the simulation of the distributed signature generation phase is computationally indistinguishable from its view from a real process of Phase 2. The difference between $\mathcal{A}$'s view in real execution and in the simulation is $C_2$. In addition, because u is generated randomly by $\mathcal{F}_{BLMQ}$, and the distribution between $u^{1/r_1}$ and $g^{r_2}$ is identical, so that $R_2$'s distribution between real execution and the simulation is identical. The zero-knowledge proof and verification are also identically distributed. So, the only difference is $C_2$. During the simulation, it is an encryption of $(\overline{S}+\rho \cdot q)(t_1)^{-1}$, in real execution, it is a ciphertext of $(r+\rho \cdot q+h) \cdot K_{ID}^{(2)}$.

We observe that, in the definition of BLMQ signature, $S=(r+h)K_{ID}=(r+h)K_{ID}^{(1)}K_{ID}^{(2)} \mod q$. Thus, $(r+h)K_{ID}^{(2)}=(t_1)^{-1} \cdot \overline{S} \mod q$ means that there exists an integer $I \in Z_q$ that $(r+h)K_{ID}^{(2)}=(t_1)^{-1} \cdot \overline{S}+l \cdot q$. In the protocol, the operation without a modular reduction is that $(r+h)K_{ID}^{(2)}$. Therefore, the difference between the real execution and the simulation with S is:
1. Real: the ciphertext $C_2$ encrypts $(t_1)^{-1} \cdot \overline{S} \mod q+l \cdot q+\rho \cdot q$
2. Simulation: the ciphertext $C_2$ encrypts $(t_1)^{-1} \cdot \overline{S} \mod q+\rho \cdot q$ It is worth pointing out that the distribution between real execution and simulation is identical. This proves that Equation 1 holds for b=1.

When b=2, i.e. $P_2$ is the corrupted one. The message $C_2$ sent by $P_2$ may be corrupted by $\mathcal{A}$, and the simulator cannot detect whether $C_2$ is a correct ciphertext. S simulates $P_1$ abortion at some random point, S chooses $$i \xleftarrow{r} \{1, \ldots, p(n)+1\}$$

randomly, where p(n) is the upper bound number of queries made by A. S chooses i with the probability of $$\frac{1}{p(n)+1},$$

that is S simulates A's view with a probability of $$\frac{1}{p(n)+1}.$$

The probability of S forging a signature in Sign is at least $$\frac{1}{p(n)+1}$$

times of the probability that A forges a signature in DistSign.

Let $\mathcal{A}$ be a P.P.T adversary in Dist $Sign^2_{\mathcal{A},\Pi}(n)$, we construct a P.P.T adversary S for $Sign_{S,\pi}(n)$. The adversary S simulates the execution for A as follows:
1. In Sign, s receives (1ⁿ,ID), where ID is the identity to generate the user's public key $H_1(ID)$.
2. S invokes $\mathcal{A}$ on input 1ⁿ and simulates oracle $\mathcal{A}$ in DistSign. Upon receiving a query (sid,m), where sid is a new session identifier, S sets the oracle reply with (proof,1,$R_1$,$C_1$) where $R_1=u^{1/r_2}$, and sends it to $\mathcal{A}$. Then, S queries its signing oracle in Sign with m and receives a signature (h,S) and S can compute u in the BLMQ signature verification algorithm. Then, $\mathcal{A}$ queries S with identifier sid, which is processed as follows:
    (a) The first message (sid,$m_1$) is processed by parsing $m_1$ as (prove,2,$R_2$,$r_2$) which should be sent to $\mathcal{F}^{RDL}_{zk}$.

S verifies the equation $R_2=g^{r_2}$ and if the equation does not hold, it simulates $P_1$ causing it to abort the protocol.
    (b) The second message (sid,$m_2$) is processed by parsing $m_2$ as $C_2$. If this is the ith query by $\mathcal{A}$, then S simulates $P_1$'s abortion. Otherwise, it continues.
3. Once $\mathcal{A}$ halts and outputs (m*,σ*), S outputs (m*,σ*) and halts.

Let j be the first query to oracle Π with (sid,$m_2$), and $P_1$ does not obtain the valid signature (h,S) which corresponds to the public key $\Pi_1$(ID). If j=i, then the difference between the distribution of $\mathcal{A}$'s view in real execution and the simulated execution by S is the ciphertext $C_1$. Since S does not hold the Paillier private key in the simulation, the indistinguishability of the simulation follows from a reduction of indistinguishability of the encryption scheme under Chosen-Plaintext Attack (CPA).

We can learn that $$|Pr[Sign_{S,\pi}(1^n)=1 \mid i=j] - Pr[Dist^{Sign^2}_{\mathcal{A},\Pi}(1^n)=1]| + \mu(n)$$

so $$Pr[Dist^{Sign^2}_{\mathcal{A},\Pi}(1^n)=1] + \frac{Pr[Sign_{S,\pi}(1^n)=1]}{1/(p(n)+1)} + \mu(n)$$

i.e.

$$Pr[Sign_{S,\pi}(1^n)=1] \geq \frac{Dist^{Sign^2}_{\mathcal{A},\Pi}(1^n)=1}{1/(p(n)+1)} - \mu(n)$$

It means that if $\mathcal{A}$ can forge a signature in Dist $Sign^2_{\mathcal{A},\Pi}$ (1ⁿ) with a non-negligible probability, then S can forge a signature in $Sign_{S,\pi}$.(1ⁿ) with a non-negligible probability. Due to BLMQ signature being existentially unforgeable, then our protocol is secure.

Theorem 2 If the Paillier-EC assumption is hard, then, Phase 2 computes $\mathcal{F}_{BLMQ}$ securely in the $\mathcal{F}_{zk}$ model in the presence of a malicious static adversary.

Proof. We analyze the security for the case of a corrupted $P_1$ and a corrupted $P_2$. First, let $P_1$ be corrupted by an adversary $\mathcal{A}$, we construct a simulator S.

In the signing phase, $P_1$ cannot do anything. All it does is to generate u and receive a ciphertext $C_2$ from $P_2$. Due to ability to simulate the protocol in the signing phase, a simulator can make the result equal to u in a signature received from $\mathcal{F}_{BLMQ}$. Therefore, the main challenge is to prove that the simulator can generate $P_1$'s view of the decryption of $C_2$, given only $\overline{S}$,(h,S) from $\mathcal{F}_{BLMQ}$ where S= $\overline{S} \cdot Q_1$.

1. On input Sign(sid,m), S sends Sign(sid,m) to $\mathcal{F}_{BLMQ}$ and receives a signature (h,S).
2. S computes u using the BLMQ verification procedure.
3. S invokes $\mathcal{A}$ with input Sign(sid,m) and simulates the following messages to ensure that the result is u:
    (a) S receives (prove,1,($R_1$,$C_1$),($r_1$,sk)) from $\mathcal{A}$.
    (b) If $R_1=g^{r_1}$, then S sets $R_2=u^{1/r_1}$, and sends (proof,2, $R_2$) to $\mathcal{A}$.
    Otherwise, S simulates $P_2$ abort, sends abortion to $\mathcal{F}_{BLMQ}$.
4. S chooses ρ∈$Z_q$, then computes $C_2=Enc_{pk}(\overline{S}+\rho \cdot q)(t_1)^{-1}$, where $\overline{S}$ is the value from the signature S received from $\mathcal{F}_{BLMQ}$, and sets the oracle reply $\mathcal{A}$ with $C_2$.

The only difference between the view of $\mathcal{A}$ in real and simulation is the way that $C_2$ is chosen. In the simulation, it is a ciphertext of $(\overline{S}+\rho \cdot q)(t_1)^{-1}$, in real execution, it is a ciphertext of $(r+\rho \cdot q+h) \cdot K_{ID}^{(2)}$. It is statistically close between these two scenarios.

Let $P_2$ be corrupted by $\mathcal{A}$, and we construct a simulator S. In the signature generation phase, S works as follows:
1. On input Sign(sid,m), S sends Sign(sid,m) to $\mathcal{F}_{BLMQ}$ and receives a signature (h,S).
2. S computes u using the BLMQ verification procedure.
3. S invokes $\mathcal{A}$ with Sign(sid,m), sets $R_1=u^{1/r_2}$ and sends $\mathcal{A}$ the message (proof,1,($R_1$,$C_1$)) internally.
4. S receives (prove,2,$R_2$,$r_2$) which indicates that $\mathcal{A}$ intends to send to $\mathcal{F}^{RDL}_{zk}$.

5. S verifies the equation $R_2=g^{r_2}$. If the equation does not hold, then S simulates $P_1$ aborting.

6. S receives $C_2$ from $P_2$, decrypts $C_2$ by using sk and reduces the result by modulo q. S checks if it is equal to $((\tilde{r}_1 r_2+h)K_{ID}^{(2)})q$, where $C_1=Enc_{pk}(\tilde{r}_1)$ If the equation holds, then S sends 'continue' to the trusted party $P_1$, and lets $P_1$ provide the output. Otherwise, S sends 'abort' to $P_1$ to instruct $P_1$ to abort.

We modify S to a simulator S who have an oracle $O_c(c',\alpha,\beta)$. The oracle $O_c(c',\alpha,\beta)$ outputs 1 if $Dec_{sk}(c',\alpha,\beta) = \alpha+\beta\cdot\tilde{r}_1$ mod q. S' simulates S as follows:

1. Compute $\alpha=h\cdot K_{ID}^{(2)}$ mod q.
2. Compute $\beta=r_2\cdot K_{ID}^{(2)}$ mod q.
3. Query $O_c(c',\alpha,\beta)$ to get b.
4. If b=1, S' continues to simulate S.

S accepts if S' accepts because these checks by S and S' are equivalent. Due to the Paillier-EC assumption, we conclude that the output generated by S in the ideal model is computationally indistinguishable from the real execution. Since the output distributions of S and S are identical in the ideal model; therefore, the output generated by S in the ideal model is computationally indistinguishable from the real execution.

Zero-knowledge Proof. In our protocol, the main zero-knowledge proof for the relation is $R_{PDL}$. We use this zero-knowledge proof directly. Thus, we omit the construction here.

Proof that r is a discrete log of R. In this section, we propose the constructions of zero-knowledge proof for the relation $R_{DL}$ such that $$R_{DL}=\{(G_3,g,R,r)|R=g^r\}$$

We use Schnorr Zero Knowledge Proof to achieve this requirement. In the signing phase, if a malicious $P_2$ sends (prove,$R_2,r_2$) to $\mathcal{F}_{zk}^{R_{DL}}$, it also receives a correct message (proof,$R_1$) from $\mathcal{F}_{zk}^{R_{DL}}$. However, $P_1$'s message in the protocol is assumed to be zero knowledge and hence does not reveal any information about the random integer $r_1$. The detailed zero-knowledge proof protocol is described as follows:

The joint statement is $(G_3,g,R)$, the prover has a witness r and wishes to prove that $R=g^r$. When the Schnorr zero-knowledge proof generation algorithm uses as input the public parameter $P=(R,g,Q_1,Q_2,G_1,G_2,G_3)$, signer's identity ID, secret value r, and public value $V=g^r$. It outputs (z,e) as follows:

1. Select $$k \xleftarrow{r} Z_q,$$

compute $K=g^k$.

2. Compute $e=H(P,ID,K,V)$
3. Compute $z=K-re$

When the Schnorr zero-knowledge proof verification algorithm uses as input the public parameter $P=(R,g,Q_1,Q_2,G_1,G_2,G_3)$, signer's identity ID, public value $V=g^r$ and Schnorr zero-knowledge proof values(z,e). Its outputs are valid or invalid as follows:

1. Perform public key validation for V.
2. Let $K_v=g^z V^e$.
3. Let $e_v=H(P,ID,K_v,V)$.
4. If $e_v=e$, then the signature is verified.

Figure 8:
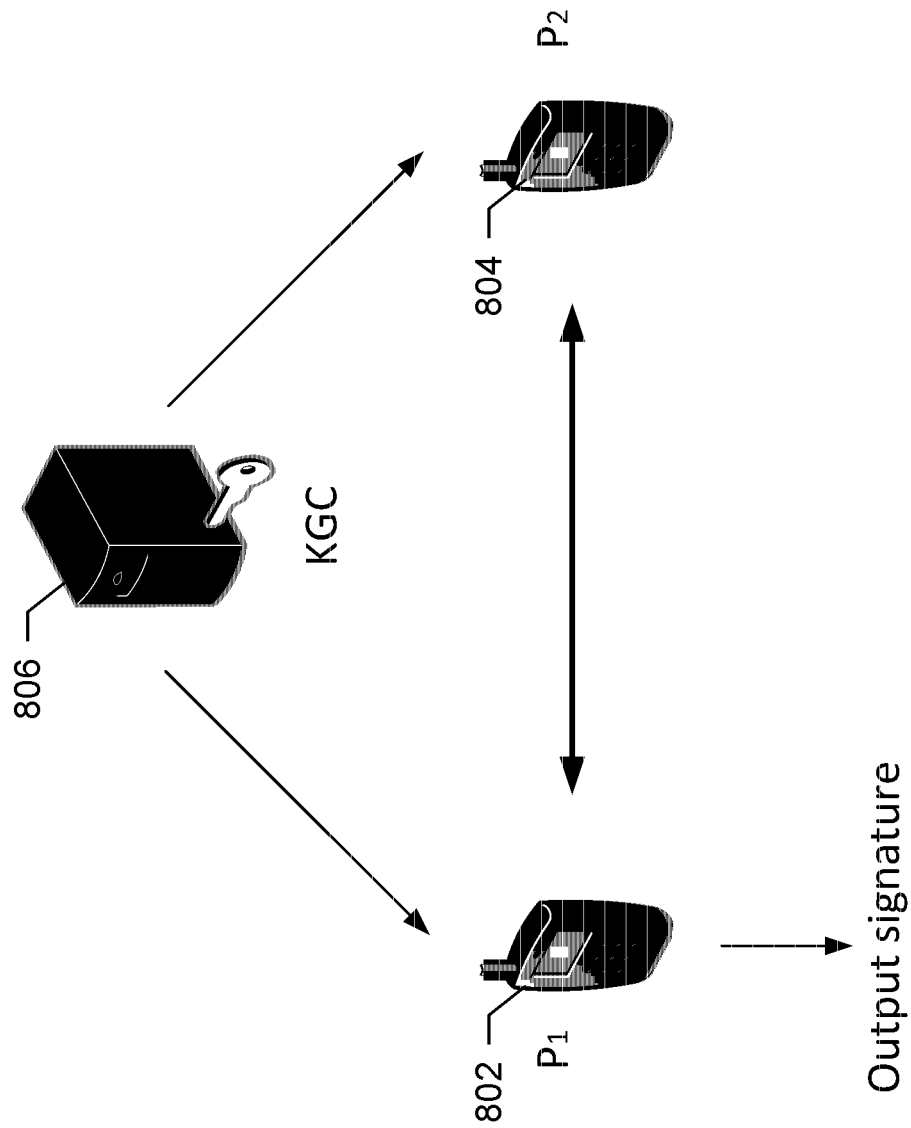
FIG. 8 illustrates an example of a system in which embodiments of the present systems and methods may be implemented.

Performance and Experimental Results. In embodiments, the MIRACL Cryptographic SDK may be used to implement embodiments of protocols. For example, embodiments of protocols were implemented and deployed on two Android devices (Google Nexus 6 with a Quad-core, 2.7 GHz processor, 3G bytes memory and the Google Android 7.1.2 operating system; Samsung Galaxy Nexus with a dual-core 1.2 GHz processor, 1G bytes memory and the Google Android 4.0 operating system) and a PC with an i7-6700 processor, 8G bytes memory and the Microsoft Windows 7 operating system. As shown in FIG. 8, in this example, the two Android phones denote two participants 802, 804, and the PC 806 represents the KGC.

Table 1 shows the different security levels of the curves.

TABLE 1

| Security level | | |
|---|---|---|
| Type | Symmetric cipher key length | Bitlength of p in prime field $F_p$ |
| MNT k = 6 | 80 | 160 |
| BN k = 12 | 128 | 256 |
| KSS k = 18 | 192 | 512 |
| BLS k = 24 | 256 | 640 |

In order to evaluate the different security levels, the following curves from Type-3 pairings were tested:
1. MNT k=6 curve that achieves AES-80 security.
2. BN k=12 curve that achieves AES-128 security.
3. KSS k=18 curve that achieves AES-192 security.
4. BLS k=24 curve that achieves AES-256 security.

Figure 9:
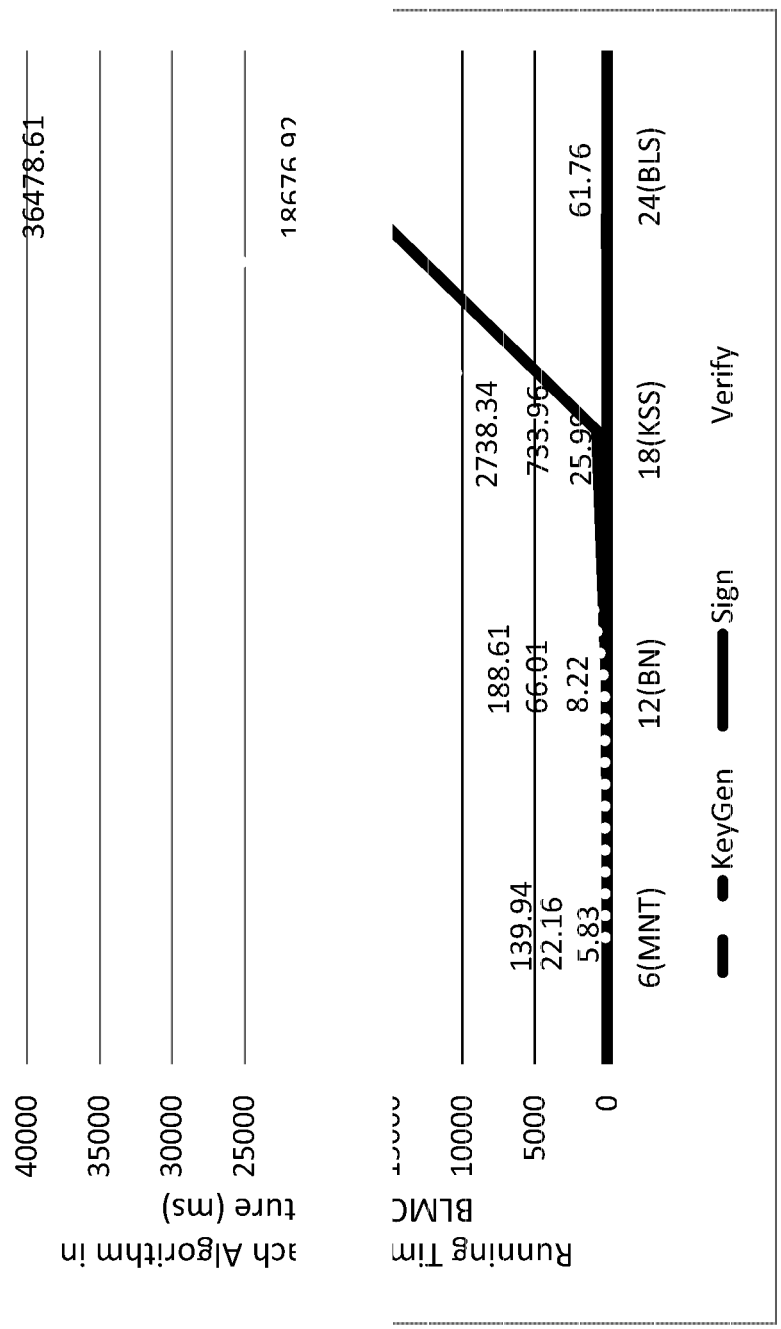
FIG. 9 illustrates an example of results of an experiment to determine performance of the BLMQ signature scheme.

In an embodiment, the BLMQ signature scheme was implemented on a Samsung Galaxy Nexus, and the running time of each algorithm for BLMQ signature scheme is shown in Table 2 and FIG. 9.

TABLE 2

| Each algorithm of BLMQ Signature (averages were computed over 1,000 executions). | | | |
|---|---|---|---|
| CurveAlgorithm | KeyGen (milliseconds) | Sign (milliseconds) | Verify (milliseconds) |
| k = 6 | 5.83 | 22.16 | 139.94 |
| k = 12 | 8.22 | 66.01 | 188.61 |
| k = 18 | 25.99 | 733.96 | 2738.34 |
| k = 24 | 61.76 | 18676.92 | 36478.61 |

Figure 10:
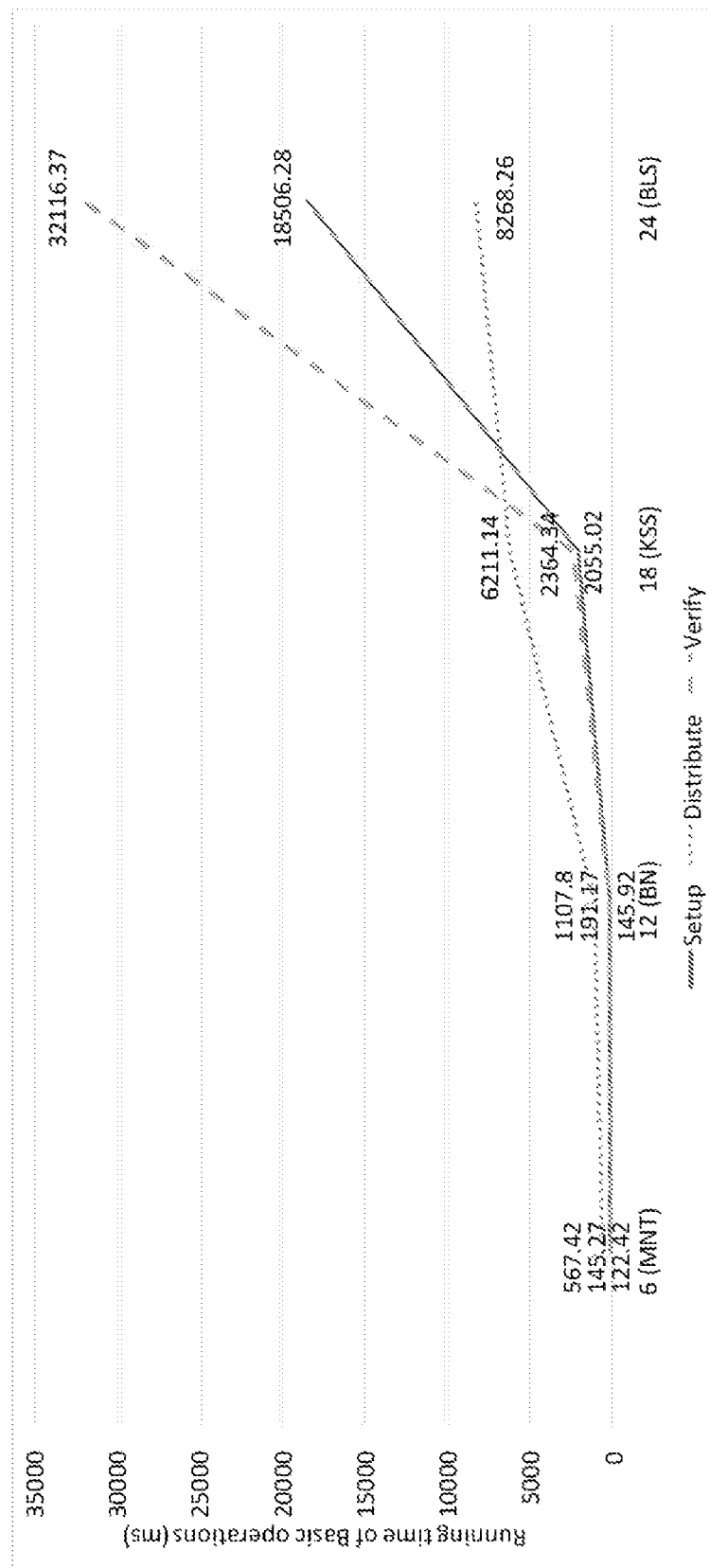
FIG. 10 illustrates an example of results of an experiment to determine performance of the distributed key generation in accordance with embodiments of the present systems and methods.

Progress in each instance of the distributed key generation phase was analyzed. Table 3 and FIG. 10 show the running times of the instances and the verification algorithm.

TABLE 3

| Distributed key generation and verification (averages were computed over 1,000 executions). | | | |
|---|---|---|---|
| CurveProgress | Setup (milliseconds) | Distribute (milliseconds) | Verify (milliseconds) |
| k = 6 | 145.27 | 567.42 | 122.42 |
| k = 12 | 145.92 | 1107.8 | 191.17 |
| k = 18 | 2055.02 | 6211.14 | 2364.34 |
| k = 24 | 18506.28 | 8268.26 | 32116.37 |

Figure 11:
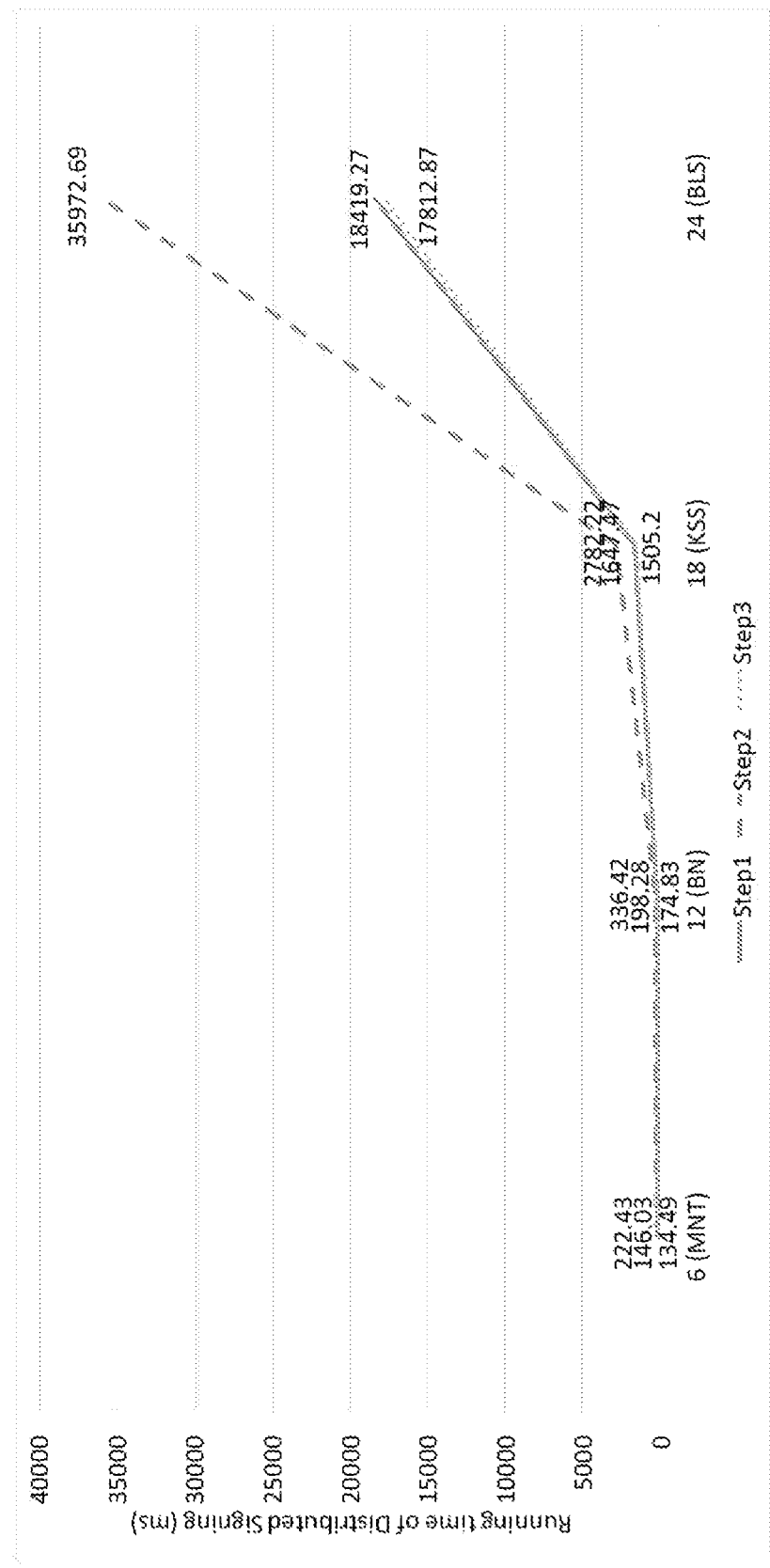
FIG. 11 illustrates an example of results of an experiment to determine computation costs of the distributed signature generation in accordance with embodiments of the present systems and methods.

The computation cost of progress in each instance in the distributed signature phase. Table 4 and FIG. 11 show the results obtained. Step 1 denotes the progress made by $P_1$ before $P_1$ sends a message to $P_2$, Step 2 denotes the progress made by $P_2$, and Step 3 denotes the progress made by $P_1$ after receiving message from $P_2$. Table 5 presents the total running times.

TABLE 4

Distributed signature generation (averages
were computed over 1,000 executions).

| CurveProgress | Step 1 | Step 2 | Step 3 |
|---|---|---|---|
| k = 6 | 146.03 ms | 222.43 ms | 134.49 ms |
| k = 12 | 198.28 ms | 336.42 ms | 174.83 ms |
| k = 18 | 1647.47 ms | 2782.22 ms | 1505.2 ms |
| k = 24 | 18419.27 ms | 35972.69 ms | 17812.87 ms |

TABLE 5

Distributed signature generation run
time (average over 1,000 executions).

| CurveDevice | $P_1$ | $P_2$ |
|---|---|---|
| k = 6 | 280.52 ms | 222.43 ms |
| k = 12 | 373.11 ms | 336.42 ms |
| k = 18 | 3152.67 ms | 2782.22 ms |
| k = 24 | 36232.14 ms | 35972.69 ms |

Conclusion. The ubiquity of wireless communications will continue in the future, ranging from autonomous vehicles to smart cities, and so on. Thus, ensuring the security of such wireless communications will become increasingly important and challenging due to the increasingly complex environment and requirements.

In this paper, we have proposed an efficient and secure two-party distributed signing protocol for the identity-based signature scheme in the IEEE P1363 standard, which is designed to generate a valid signature without the need to recover the private key. Both the security analysis and the performance evaluation of our proposed protocol have demonstrated its potential to be used for the distributed signature generation in the wireless environment.

Figure 12:
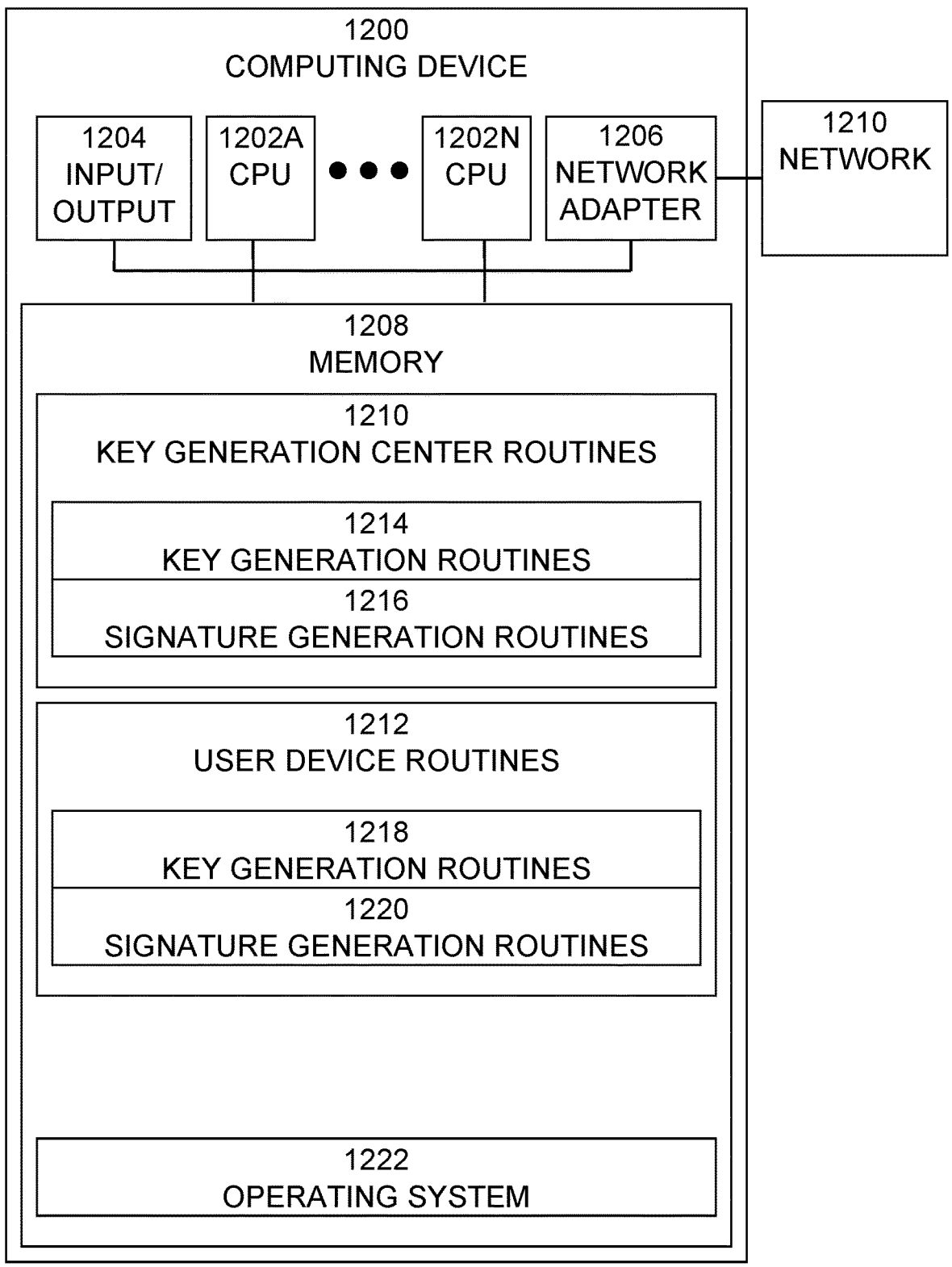
FIG. 12 illustrates an example of a computing device in which embodiments of the present systems and methods may be implemented.

An exemplary block diagram of a computing device 1200, in which entities and processes involved in the embodiments described herein may be implemented, is shown in FIG. 12. Computing device 1200 may typically be implemented using one or more programmed general-purpose computer systems, such as embedded processors, systems on a chip, personal computers, workstations, server systems, and minicomputers or mainframe computers, or in distributed, networked computing environments. Computing device 1200 may include one or more processors (CPUs) 1202A-1202N, input/output circuitry 1204, network adapter 1206, and memory 1208. CPUs 1202A-1202N execute program instructions in order to carry out the functions of the present communications systems and methods. Typically, CPUs 1202A-1202N are one or more microprocessors, such as an INTEL CORE® processor.

FIG. 12 illustrates an embodiment in which computing device 1200 is implemented as a single multi-processor computer system, in which multiple processors 1202A-1202N share system resources, such as memory 1208, input/output circuitry 1204, and network adapter 1206. However, the present communications systems and methods also include embodiments in which computing device 1200 is implemented as a plurality of networked computer systems, which may be single-processor computer systems, multi-processor computer systems, or a mix thereof.

Input/output circuitry 1204 provides the capability to input data to, or output data from, computing device 1200. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 1206 interfaces device 1200 with a network 1210. Network 1210 may be any public or proprietary LAN or WAN, including, but not limited to the Internet.

Memory 1208 stores program instructions that are executed by, and data that are used and processed by, CPU 1202 to perform the functions of computing device 1200. Memory 1208 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 1208 may vary depending upon the function that computing device 1200 is programmed to perform. In the example shown in FIG. 12, exemplary memory contents are shown representing routines and data for embodiments of the processes described above. However, one of skill in the art would recognize that these routines, along with the memory contents related to those routines, may not be included on one system or device, but rather distributed among a plurality of systems or devices, based on well-known engineering considerations. The present systems and methods may include any and all such arrangements.

In the example shown in FIG. 12, memory 1208 is shown as including both key generation center routines 1210 and user device routines 1212. However, in many embodiments, only one such set of routines may be present in the device. For example, a key generation center (KGC) may be implemented using one or more server computer systems and may include only key generation center routines 1210, while a user device may be may be implemented using a mobile device, such as a smartphone, and may include only user device routines 1212.

In the example shown in FIG. 12, key generation center routines 1210 may include key generation routines 1214 and signature generation routines 1216, while user device routines 1212 may include key generation routines 1218 and signature generation routines 1220. Key generation routines 1214 may include software routines to perform the KGC portion of Phase 1 of embodiments of processes, as described above. Signature generation routines 1216 may include software routines to perform the KGC portion of Phase 2 of embodiments of processes, as described above. Key generation routines 1218 may include software routines to perform the user device portion of Phase 1 of embodiments of processes, as described above. Signature generation routines 1220 may include software routines to perform the user device portion of Phase 2 of embodiments of processes, as described above. Operating system 1222 may provide overall system functionalities.

As shown in FIG. 12, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it.

Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. Thus, it is impossible for any program to damage the execution of any of the other programs running on the system. However, the programs have no way to exchange any information except through the operating system (or by reading files stored on the file system).

Multi-process computing is similar to multi-tasking computing, as the terms task and process are often used interchangeably, although some operating systems make a distinction between the two. The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the blocks may occur out of the order noted in the Figures. For example, two blocks shown in succession may, in fact, be executed substantially concurrently, or in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or that carry out combinations of special purpose hardware and computer instructions. Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

From the above description, it can be seen that the present invention provides a system, computer program product, and method for the efficient execution of the described techniques. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

While the foregoing written description of the invention enables one of ordinary skill to make and use what is considered presently to be the best mode thereof, those of ordinary skill will understand and appreciate the existence of alternatives, adaptations, variations, combinations, and equivalents of the specific embodiment, method, and examples herein. Those skilled in the art will appreciate that the within disclosures are exemplary only and that various modifications may be made within the scope of the present invention. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. The invention should therefore not be limited by the described embodiment, method, and examples, but by all embodiments and methods within the scope and spirit of the invention. Accordingly, the present invention is not limited to the specific embodiments as illustrated herein, but is only limited by the following claims.

What is claimed is:

1. A system for generating a distributed cryptographic key and a cryptographic signature comprising:
   an electronic computing device operating as a key generating center;
   a first electronic device;
   a second electronic device;
   the key generating center, the first electronic device, and the second electronic device in communication with each other to generate a distributed cryptographic key by:
      creating a first part of a private cryptographic key;
      creating a second part of the private cryptographic key;
      creating a public cryptographic key;
      transmitting the public cryptographic key and the first part of the private cryptographic key to the first electronic device; and
      transmitting the public cryptographic key and the second part of the private cryptographic key to the second electronic device;
   the first electronic device to provide a cryptographic signature to the second electronic device by
      transmitting from the first electronic device to the second electronic device an indicator that a cryptographic signature for a message will be transmitted;
      upon receiving the first transmission, the second electronic device computing a first intermediate value and a second intermediate value using a first random number and a second random number and transmitting to the first electronic device the first intermediate value and the second intermediate value;
      upon receiving the second transmission, the first electronic device computing a third intermediate value using a third random number, a fourth random number, and the message, and transmitting to the second electronic device the third intermediate value;
      upon receiving the third transmission, the second electronic device computing a fourth intermediate value and a fifth intermediate value and transmitting to the first electronic device the fourth intermediate value and the fifth intermediate value;
      upon receiving the fourth transmission, the first electronic device computing the cryptographic signature for the message and transmitting the cryptographic signature to the second electronic device; and
      upon receiving the cryptographic signature, the second electronic device verifying the cryptographic signature by computing a sixth intermediate value and comparing the sixth intermediate value with the cryptographic signature.

2. The system of claim 1, wherein the distributed cryptographic key is based upon an identity of the first electronic device.

3. The system of claim 2, wherein generating the distributed cryptographic key comprises using the identity of the first electronic device as an input to a hash function.

4. The system of claim 1, wherein the Paillier method is used to generate the distributed cryptographic key.

5. The system of claim 1, wherein the first electronic device, upon receiving the second transmission, computes the third intermediate value using an output of a hash function wherein the message is an input of the hash function.

6. A method of generating a distributed cryptographic key and a cryptographic signature comprising the steps of:

creating, at an electronic computing device operating as a key generation center, a first part of a private cryptographic key;

creating, at the key generation center, a second part of the private cryptographic key;

creating, at the key generation center, a public cryptographic key;

transmitting the public cryptographic key and the first part of the private cryptographic key from the key generation center to a first electronic device;

transmitting the public cryptographic key and the second part of the private cryptographic key from the key generation center to a second electronic device;

transmitting from the first electronic device to the second electronic device an indicator that a cryptographic signature for a message will be transmitted;

upon receiving the first transmission, the second electronic device computing a first intermediate value and a second intermediate value using a first random number and a second random number and transmitting to the first electronic device the first intermediate value and the second intermediate value;

upon receiving the second transmission, the first electronic device computing a third intermediate value using a third random number, a fourth random number, and the message, and transmitting to the second electronic device the third intermediate value;

upon receiving the third transmission, the second electronic device computing a fourth intermediate value and a fifth intermediate value and transmitting to the first electronic device the fourth intermediate value and the fifth intermediate value;

upon receiving the fourth transmission, the first electronic device computing the cryptographic signature for the message and transmitting the cryptographic signature to the second electronic device;

upon receiving the cryptographic signature, the second electronic device verifying the cryptographic signature by computing a sixth intermediate value and comparing the sixth intermediate value with the cryptographic signature.

7. The method of claim 6, wherein the distributed cryptographic key is based upon an identity of the first electronic device.

8. The method of claim 7, wherein generating the distributed cryptographic key comprises using the identity of the first electronic device as an input to a hash function.

9. The method of claim 6, wherein the Paillier method is used to generate the distributed cryptographic key.

10. The method of claim 6, wherein the first electronic device, upon receiving the second transmission, computes the third intermediate value using an output of a hash function wherein the message is an input of the hash function.

* * * * *